(12) United States Patent
Myers et al.

(10) Patent No.: US 11,886,322 B2
(45) Date of Patent: Jan. 30, 2024

(54) AUTOMATICALLY IDENTIFYING A DIAGNOSTIC ANALYZER APPLICABLE TO A DIAGNOSTIC ARTIFACT

(71) Applicant: Microsoft Technology Licensing, LLC, Redmond, WA (US)

(72) Inventors: Del Myers, Seattle, WA (US); William Xie, Sammamish, WA (US); Mark Anthony Jelf Downie, Hilliard, OH (US); Joseph Mark Schmitt, Seattle, WA (US); Justin Michael Anderson, Dublin, CA (US); Gregory Bernard Miskelly, Seattle, WA (US); Claudiu-Constantin Guiman, Brooklyn, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 17/526,176

(22) Filed: Nov. 15, 2021

(65) Prior Publication Data
US 2023/0153227 A1    May 18, 2023

(51) Int. Cl.
*G06F 11/36* (2006.01)
(52) U.S. Cl.
CPC .................. *G06F 11/366* (2013.01)
(58) Field of Classification Search
CPC ........... G06F 11/079; G06F 11/36–362; G06F 11/3648–366; G06F 11/3696
See application file for complete search history.

(56) References Cited

U.S. PATENT DOCUMENTS 9,256,512 B1 * 2/2016 Shiraishi ............. G06F 11/3604
11,055,208 B1 * 7/2021 Pandurangarao ... G06F 11/3692
(Continued)

OTHER PUBLICATIONS

Ma et al., "Automatic Classification of Software Artifacts in Open-Source Applications", published by 2018 ACM/IEEE 15th International Conference on Mining Software Repositories, pp. 414-425 425 (Year: 2018).*

(Continued)

*Primary Examiner* — S. Sough
*Assistant Examiner* — Zheng Wei
(74) *Attorney, Agent, or Firm* — Workman Nydegger

(57) ABSTRACT

Methods, systems, and computer program products for using a confidence measure to automatically identify a diagnostic analyzer that applies to a diagnostic artifact. A plurality of diagnostic analyzers are each configured to analyze diagnostic artifacts relating to prior executions of software entities. A confidence measure is calculated for each diagnostic analyzer. Each confidence measure indicates a likelihood that the diagnostic analyzer applies to a particular diagnostic artifact. Calculating each confidence measure comprises applying one or more heuristics specific to the diagnostic analyzer against the particular diagnostic artifact, with an outcome of application of each heuristic contributing to the confidence measure for the respective diagnostic analyzer. Based at least on calculating the confidence measure for each diagnostic analyzer, and based on one or more determined thresholds, it is determined whether to include each diagnostic analyzers in a set of diagnostic analyzers with which to analyze the particular diagnostic artifact.

20 Claims, 4 Drawing Sheets

(56) References Cited

U.S. PATENT DOCUMENTS

| | | | |
|---|---|---|---|
| 2013/0238940 A1* | 9/2013 | Chalmers | G06F 11/3688 714/E11.178 |
| 2018/0095869 A1* | 4/2018 | Peer | G06F 11/3664 |
| 2018/0239659 A1 | 8/2018 | Nallabothula et al. | |
| 2019/0325980 A1* | 10/2019 | Nelson | G06F 11/3636 |
| 2020/0193458 A1* | 6/2020 | Vijeyakumaar | G06F 11/3438 |

OTHER PUBLICATIONS

"International Search Report and Written Opinion Issued in PCT Application No. PCT/US22/041131", dated Dec. 15, 2022, 11 Pages. (MS# 410641-WO-PCT).

* cited by examiner

300

Please Select Diagnostic Analyzers To Apply:

[X] Http web requests (80% confidence)
    [ ] Exceptions (5% confidence)
    [X] String duplications (60% confidence)
    [ ] Array usage (10% confidence)

CANCEL     OK

FIG. 3

AUTOMATICALLY IDENTIFYING A DIAGNOSTIC ANALYZER APPLICABLE TO A DIAGNOSTIC ARTIFACT

BACKGROUND

Diagnosing faults and other issues in software is a complex task, that often involves repetitive work. To this end, many tools have been developed to surface faults in software, based on the generation and analysis of diagnostic artifacts, such as memory dumps, process snapshots, and the like. This includes the development and use of automated analysis tools that reduce the burden on humans performing the diagnostics. However, the execution of automated analysis tools can often be memory and CPU intensive.

BRIEF SUMMARY

At least some embodiments described herein provide methods, systems, and computer program products for applying heuristics to a diagnostic analyzer, which are used to determine a confidence measure about whether or not the diagnostic analyzer applies to a diagnostic artifact being diagnosed. In embodiments, this confidence measure is a numeric measure that represents the confidence in the usefulness of applying the diagnostic analyzer to the diagnostic artifact (i.e., whether the diagnostic analyzer will provide useful results when analyzing the diagnostic artifact).

In embodiments, confidence measures for a plurality of a diagnostic analyzers are used to automatically identify one or more of the plurality of diagnostic analyzers that are applicable to a particular diagnostic artifact. In embodiments, this confidence measure is also presented to a human user to help the human user determine which diagnostic analyzer(s) to apply to the particular diagnostic artifact. In embodiments, this confidence measure is also used to automatically apply one or more diagnostic analyzer(s) to the particular diagnostic artifact.

In embodiments, when a confidence measure indicates that diagnostic analyzer may not be useful for analyzing a diagnostic artifact (e.g., as having a value below a threshold), that diagnostic analyzer is excluded from being applied to the diagnostic artifact. This, in turn, reduces the amount of memory, CPU time, and energy that is consumed running diagnostic analyzers against the diagnostic artifact. Additionally, by focusing on only those diagnostic analyzers having confidence measures that indicate a high likelihood of being useful for analyzing a diagnostic artifact (e.g., as having a value above a threshold), a time for obtaining diagnostic results is reduced, and a relevance of the results generated is increased.

In some aspects, the techniques described herein relate to a method, a computer system, and/or a computer program product for using a confidence measure to automatically identify a diagnostic analyzer that applies to a diagnostic artifact. The techniques described herein: identify a plurality of diagnostic analyzers that are each configured to analyze diagnostic artifacts relating to prior executions of software entities, in order to generate analysis reports of one or more attributes of the prior executions of the software entities; identify a particular diagnostic artifact relating to a particular prior execution of a particular software entity; calculate a confidence measure for each respective diagnostic analyzer of the plurality of diagnostic analyzers, each confidence measure indicating a likelihood that the respective diagnostic analyzer applies to the particular diagnostic artifact, calculating each confidence measure including applying each of one or more heuristics specific to the respective diagnostic analyzer against the particular diagnostic artifact, an outcome of application of each heuristic against the particular diagnostic artifact contributing to the confidence measure for the respective diagnostic analyzer; and based on calculating the confidence measure for each respective diagnostic analyzer of the plurality of diagnostic analyzers, determine whether to include or exclude each of the plurality of diagnostic analyzers in a set of diagnostic analyzers with which to analyze the particular diagnostic artifact, including: based on a first confidence measure for a first respective diagnostic analyzer being higher than a determined threshold, determining to include the first respective diagnostic analyzer in the set of diagnostic analyzers; and based on a second confidence measure for a second respective diagnostic analyzer being lower than the determined threshold, determining to exclude the second respective diagnostic analyzer from the set of diagnostic analyzers.

In some aspects, the techniques described herein relate to a method, a computer system, and/or a computer program product, wherein the particular software entity includes a process, and wherein the particular diagnostic artifact includes one of: a memory dump of the process, a snapshot of the process, a time-travel trace of the process, or an event trace log of the process.

In some aspects, the techniques described herein relate to a method, a computer system, and/or a computer program product, wherein applying each of the one or more heuristics specific to the respective diagnostic analyzer against the particular diagnostic artifact includes: applying at least one heuristic directly to the particular diagnostic artifact. In some aspects, the techniques described herein relate to a method, a computer system, and/or a computer program product, wherein applying the at least one heuristic directly to the particular diagnostic artifact includes at least one of: identifying a heap data structure contained in the particular diagnostic artifact, or identifying diagnostic metadata contained within the particular diagnostic artifact.

In some aspects, the techniques described herein relate to a method, a computer system, and/or a computer program product, wherein applying each of the one or more heuristics specific to the respective diagnostic analyzer against the particular diagnostic artifact includes: applying at least one heuristic to diagnostic metadata that is separate from the particular diagnostic artifact. In some aspects, the techniques described herein relate to a method, a computer system, and/or a computer program product, wherein applying the at least one heuristic to the diagnostic metadata that is separate from the particular diagnostic artifact includes: identifying a counter in the diagnostic metadata.

In some aspects, the techniques described herein relate to a method, a computer system, and/or a computer program product, wherein the set of diagnostic analyzers is a first set of diagnostic analyzers, and wherein the techniques described herein: present a second set of diagnostic analyzers at a user interface, the second set of diagnostic analyzers including the first set of diagnostic analyzers, presenting the second set of diagnostic analyzers at the user interface including at least one of: presenting an indication of a calculated confidence measure for each respective diagnostic analyzer in the second set of diagnostic analyzers; sorting the second set of diagnostic analyzers according to the calculated confidence measure for each respective diagnostic analyzer in the second set of diagnostic analyzers; or presenting each respective diagnostic analyzer in the first set of diagnostic analyzers as being selected for analyzing the particular diagnostic artifact. In some aspects, the techniques described herein relate to a method, a computer system, and/or a computer program product, wherein the second set of diagnostic analyzers includes at least the second respective diagnostic analyzer that was excluded from the first set of diagnostic analyzers. In some aspects, the techniques described herein relate to a method, a computer system, and/or a computer program product, wherein presenting the second set of diagnostic analyzers at the user interface also includes: presenting the second respective diagnostic analyzer as being not selected for analyzing the particular diagnostic artifact.

In some aspects, the techniques described herein relate to a method, a computer system, and/or a computer program product, and wherein the techniques described herein: automatically analyze the particular diagnostic artifact using each diagnostic analyzer in the set of diagnostic analyzers. In some aspects, the techniques described herein relate to a method, a computer system, and/or a computer program product, and wherein the techniques described herein: use each diagnostic analyzer in the set of diagnostic analyzers in a sorted order that is based on a calculated confidence measure for each respective diagnostic analyzer in the set of diagnostic analyzers.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example of a user interface showing a presentation of a set of calculated confidence measures for a set of diagnostic analyzers.

DETAILED DESCRIPTION

Figure 1:
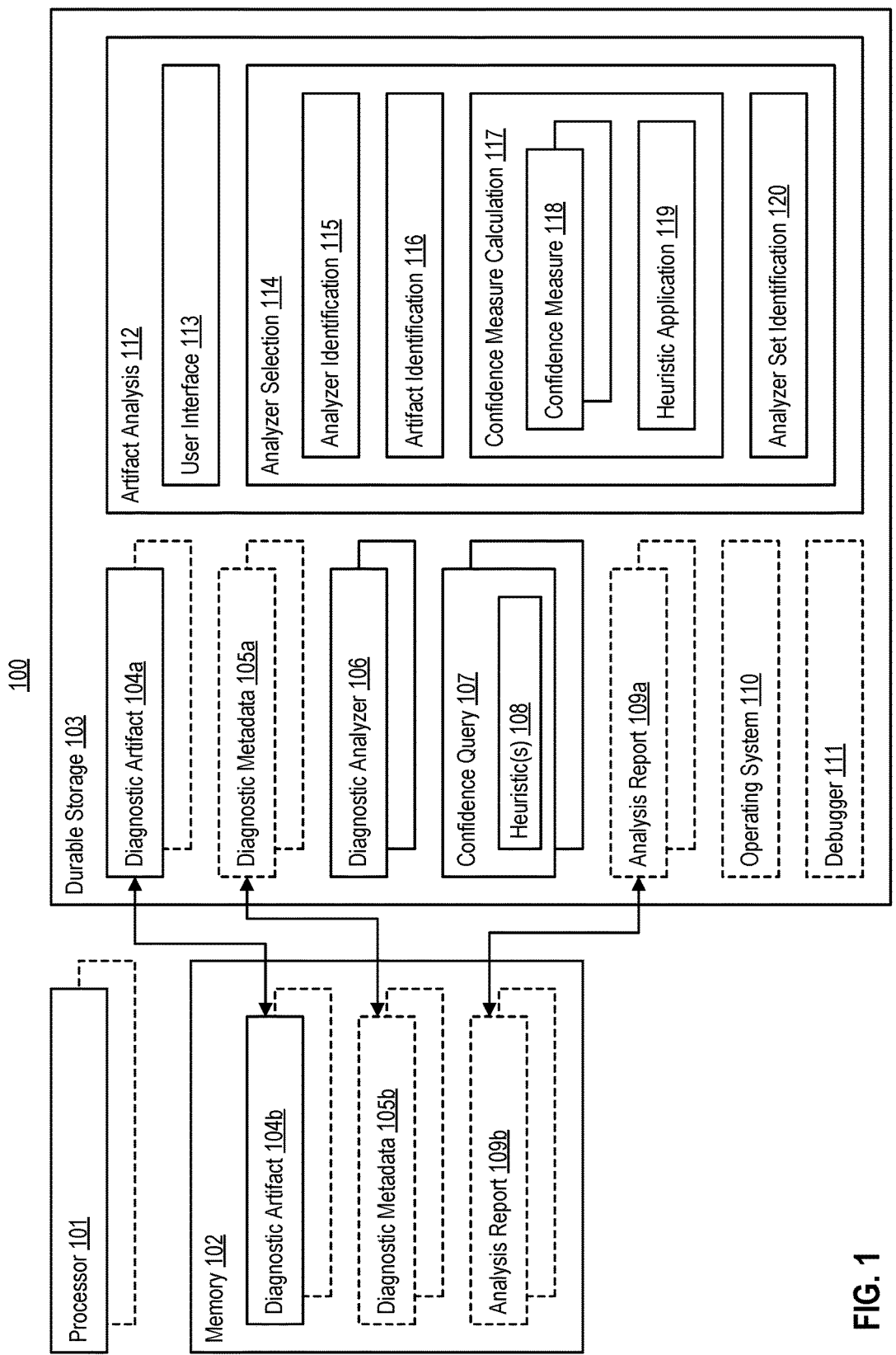
FIG. 1 illustrates an example computer architecture that facilitates using a confidence measure to automatically identify diagnostic analyzer(s) that apply to a diagnostic artifact.

FIG. 1 illustrates an example computer system 100 that facilitates using a confidence measure to automatically identify diagnostic analyzer(s) that apply to a diagnostic artifact. As shown, computer system 100 includes one or more processors, including processor 101; memory 102 (e.g., main or system memory); and durable storage 103 (e.g., one more hardware storage devices).

Computer system 100 also includes one or more diagnostic artifacts, including diagnostic artifact 104, which can be stored in one or both of durable storage 103 (i.e., diagnostic artifact 104a) or memory 102 (i.e., diagnostic artifact 104b). In embodiments, diagnostic artifact 104 includes diagnostic data relating to execution of a process at computer system 100, or at another computer system. Thus, a "diagnostic artifact" includes diagnostic data relating to a prior execution of a software entity. In various embodiments, the diagnostic artifact 104 is a memory dump (e.g., a memory dump of an operating system 110 kernel, or a process executing on the operating system 110), a process snapshot (e.g., comprising a representation of the entirety of a process's memory at a singular point in time), an event trace log of a process, a time-travel trace of a process, and the like. In embodiments, an event trace log is generated by a kernel-level tracing facility (e.g., DTrace, Event Tracing for Windows), and comprises kernel and/or application-defined events that occurred during execution of a subject process. In embodiments, a time-travel trace is a recording of a prior execution of a process, and which recording enables the process to be replayed later both forwards and backwards.

Computer system 100 also includes a plurality of diagnostic analyzers, including diagnostic analyzer 106. In embodiments, diagnostic analyzer 106 is an analysis tool that is applied to (e.g., executed against) one or more diagnostics artifacts in order to generate an analysis report 109 (e.g., analysis report 109a in durable storage 103, analysis report 109b in memory 102, etc.) for each diagnostics artifact to which the diagnostic analyzer 106 is applied. In embodiments, analysis report 109 comprises one or more attributes of a prior execution of a software entity, as derived from a corresponding diagnostic artifact. For example, analysis report 109 may comprise a human or machine-readable summary or aggregation of information extracted by diagnostic analyzer 106 from diagnostic artifact 104 or diagnostic metadata 105 related to diagnostic artifact 104. In various examples, analysis report 109 includes one or more of: a listing of Hypertext Transfer Protocol (HTTP) requests that are currently allocated in a process, a current number of empty allocated arrays in the process, a list of duplicated strings in the process, a list of exceptions in the process, a list of threads that are deadlocked, and the like.

As mentioned, computer system 100 facilitates using a confidence measure to automatically identify diagnostic analyzer(s) that apply to a diagnostic artifact. To the accomplishment of the foregoing, the durable storage 103 is shown as including an artifact analysis component 112 and a plurality of confidence queries, including confidence query 107. In general, the artifact analysis component 112 uses each confidence query to calculate a corresponding confidence measure for a different diagnostic analyzer. Thus, in one example, the artifact analysis component 112 uses a confidence query 107 (i.e., corresponding to diagnostic analyzer 106) to calculate a confidence measure of applicability of diagnostic analyzer 106 to diagnostic artifact 104.

In embodiments, a confidence measure is a numeric measure (e.g., expressed as number between 0 and 1, as a percentage, etc.) that represents a confidence that diagnostic analyzer 106 would generate an analysis report 109 containing relevant/useful data, when diagnostic analyzer 106 is applied to diagnostic artifact 104. Stated differently, the confidence measure represents a predicted confidence that the diagnostic analyzer 106 should be executed against the diagnostic artifact 104. In embodiments, the artifact analysis component 112 operates by applying heuristic(s) 108 against the diagnostic artifact 104, with the outcome of each heuristic potentially contributing to (e.g., increasing or decreasing a numeric value of) the confidence measure for diagnostic analyzer 106, as it relates to the diagnostic artifact 104.

In embodiments, applying a heuristic against a diagnostic artifact comprises applying the heuristic directly to the diagnostic artifact (e.g., to diagnostic artifact 104 directly). For example, a heuristic may walk/analyze a heap data structure contained within a diagnostic artifact comprising a process snapshot, a heuristic may identify strings at a well-known offset from a loaded module contained in a diagnostic artifact comprising a memory dump or a process snapshot, etc.

In embodiments, applying a heuristic against a diagnostic artifact additionally, or alternatively, comprises applying the heuristic to diagnostic metadata that is separate from the diagnostic artifact (e.g., as a separate "process information" data structure). For example, computer system 100 is illustrated as potentially including diagnostic metadata 105 (e.g., diagnostic metadata 105a in durable storage 103, diagnostic metadata 105b in memory 102, etc.) relating to diagnostic artifact 104.

In embodiments, diagnostic metadata 105 comprises one or more data structures that contain various data points that are inferable from the diagnostic artifact 104, and/or that are generated (e.g., by operating system 110 and/or debugger 111) in connection with execution of a process to which diagnostic artifact 104 applies. One example data point is the name and/or versions of one or more modules (e.g., from operating system 110 or third-party software) that are loaded into a process. Another example data point is system information corresponding to computer system 100, such as one or more of: an architecture of processor 101, a name and/or version of operating system 110, a number of physical and/or virtual CPUs (e.g., processor 101), a total amount of physical random-access memory (RAM) (e.g., memory 102), and the like. Another example data point is a set of one or more performance counters collected for a process. In embodiments, performance counters represent aggregate information about a running process, such as one or more of: a percentage of CPU usage for the process, a number of HTTP requests made per second, a number of HTTP responses processed per second, a number of input/output (I/O) requests made per second, a number of database requests made per second, a number of memory allocations made per second, a number of threads executing in the process, an amount of virtual memory consumed by the process, a percent of physical memory consumed by the process, a number of requests queued to be executed on a thread pool, a number of thread pools and threads in a thread pool, and the like. Another example data point is a reason for capturing the diagnostic artifact 104, such as one or more of: an exception was thrown, a performance counter exceeded a defined threshold, a user manually requested the diagnostic artifact 104, the process stopped on a breakpoint or debug step operation (e.g., within debugger 111), and the like.

Figure 2:
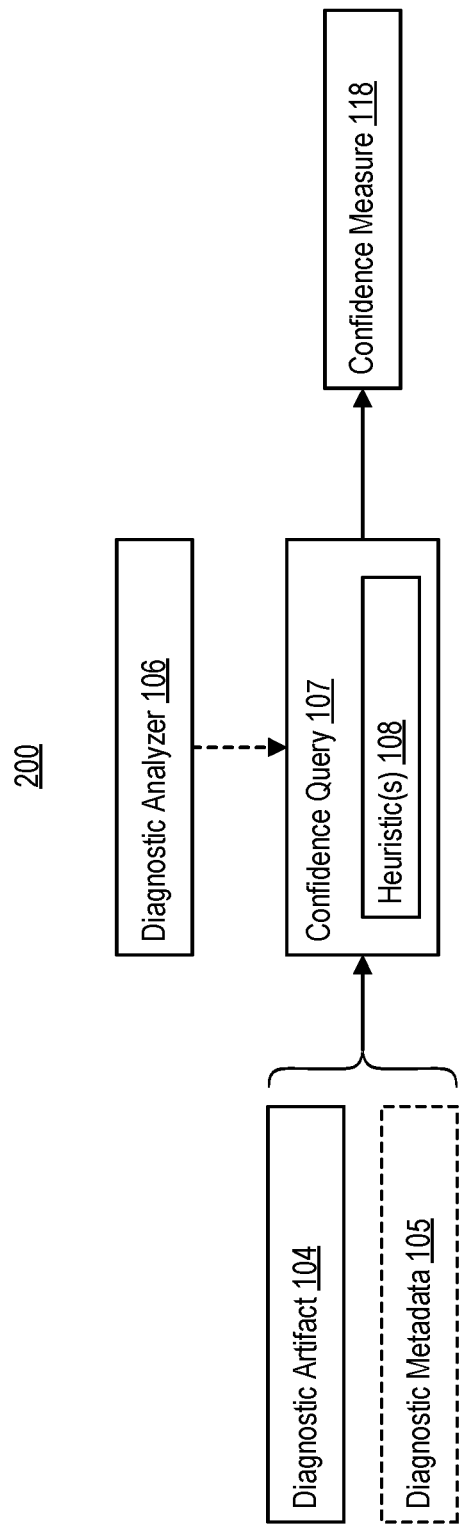
FIG. 2 illustrates an example process flow of a confidence analysis of a diagnostic analyzer as it relates to a diagnostic artifact.

To demonstrate general operation of the artifact analysis component 112, FIG. 2 illustrates an example process flow 200 of a confidence analysis of a diagnostic analyzer as it relates to a diagnostic artifact. In FIG. 2, the artifact analysis component 112 computes a confidence measure 118 predicting a usefulness of diagnostic analyzer 106 for generating an analysis report (e.g., analysis report 109) for diagnostic artifact 104. As shown by a broken arrow between diagnostic analyzer 106 and confidence query 107, the artifact analysis component 112 selects confidence query 107 as confidence query that corresponds to diagnostic analyzer 106. The artifact analysis component 112 then uses the diagnostic artifact 104, potentially along with diagnostic metadata 105 that corresponds to the diagnostic artifact 104, as input to the confidence query 107. The confidence query 107, in turn, applies heuristic(s) 108 to those inputs, in order to generate the confidence measure 118.

In one particular example, a common problem with memory consumption in contemporary applications is the generation of too many HTTP requests without correctly disposing those requests, which can result in decreased throughput. Thus, in embodiments, diagnostic analyzer 106 operates against diagnostic artifacts to generate an analysis report 109 of the HTTP requests that are currently allocated in a process for which the diagnostic artifact was generated. In embodiments, the confidence query 107 is used by the artifact analysis component 112 to determine whether or not this diagnostic analyzer 106 would produce an analysis report 109 against a subject diagnostic artifact, such as diagnostic artifact 104, that is useful. In one example, the confidence query 107 applies one or more of heuristic(s) 108 to diagnostic artifact 104 and/or diagnostic metadata 105 to calculate a confidence measure.

One example heuristic of heuristic(s) 108 determines (e.g., from loaded module information in diagnostic metadata 105) whether a networking and/or HTTP module (e.g., "System.Net" and/or "System.Net.Http" in the .NET runtime) was loaded into a process from which diagnostic artifact 104 was generated. If not, the confidence query 107 ensures that confidence measure has a zero value (i.e., because the diagnostic analyzer 106 would be irrelevant to this diagnostic artifact 104).

Another example heuristic of heuristic(s) 108 determines (e.g., from a performance counter in diagnostic metadata 105) if a number of HTTP requests per second is above or below a threshold (e.g., one hundred requests per second). In embodiments, the confidence query 107 then either increases the confidence measure by a relatively small amount (e.g., by adding 0.1 to the confidence measure) if the number is less than the threshold (e.g., the request rate is likely not an issue), or increases the confidence measure by a relatively larger amount (e.g., by adding 0.25 to the confidence measure) if the number is greater than the threshold (e.g., this is an HTTP application with a large number of requests).

Another example heuristic of heuristic(s) 108 determines (e.g., from a performance counter in diagnostic metadata 105) if a number of HTTP responses per second is zero. If so, the confidence query 107 increases the confidence measure by a relatively large amount (e.g., by adding 1.0 to the confidence measure), since the response rate is likely an issue.

Another example heuristic of heuristic(s) 108 calculates (e.g., from a performance counter in diagnostic metadata 105) a ratio of HTTP responses per second to HTTP requests per second, and the confidence query 107 increases the confidence measure based on this ratio, such as according to the following equation:

$$\text{confidence} = \text{confidence} + \left(.75 * \frac{RequestsPerSecond - ResponsesPerSecond}{RequestsPerSecond}\right)$$

In embodiments, for a given diagnostic artifact (e.g., diagnostic artifact 104), the artifact analysis component 112 calculates a respective confidence measure for each diagnostic analyzer 106 in a library of a plurality of diagnostic analyzers, resulting in a set of a plurality of confidence measures. Then, using these confidence measures, the artifact analysis component 112 automatically determines a set of one or more diagnostic analyzers to apply to the diagnostic artifact. In embodiments, this includes selecting one or more first diagnostic analyzers for inclusion in the set of diagnostic analyzers, based on a respective confidence measure for each of those one or more first diagnostic analyzers being above a determined threshold (e.g., greater than or equal to 0.5, or 50%). In embodiments, this also includes selecting one or more second diagnostic analyzers for exclusion from the set of diagnostic analyzers, based on a respective confidence measure of each for those one or more second diagnostic analyzers being below a determined threshold (e.g., less than 0.5, or 50%).

In embodiments, the artifact analysis component 112 uses a set of calculated confidence measures for a set of diagnostic analyzers to automatically select and apply one or more diagnostic analyzer(s) to a subject diagnostic artifact, such as by automatically applying the one or more first diagnostic analyzers included in the set of diagnostic analyzers to the subject diagnostic artifact.

In embodiments, the artifact analysis component 112 additionally, or alternatively, presents a set of calculated confidence measures to a human user, to help the human user determine (or at least confirm) which diagnostic analyzer(s) to apply to the particular diagnostic artifact. For example, FIG. 3 illustrates an example of a user interface 300 showing a presentation of a set of calculated confidence measures for a set of diagnostic analyzers. In FIG. 3, user interface 300 includes an identity of each diagnostic analyzer (e.g., "Http web requests," "Exceptions," etc.), along with a calculated confidence measure for that diagnostic analyzer (e.g., "80% confidence," "5% confidence," etc.).

In some embodiments, the artifact analysis component 112 visually preselects one or more diagnostic analyzers (e.g., the one or more first diagnostic analyzers) having a confidence measure above a defined threshold for application to a diagnostic artifact, and leaves one or more diagnostic analyzers (e.g., the one or more second diagnostic analyzers) having a confidence measure below the defined threshold visually unselected. For example, user interface 300 shows "Http web requests" and "String duplications" as being preselected for application to a diagnostic artifact (e.g., for having a confidence measure greater than or equal to a 50% confidence threshold with respect to that diagnostic artifact), while "Exceptions" and "Array usage" remain unselected (e.g., for having a confidence measure below the 50% confidence threshold with respect to that diagnostic artifact).

Figure 4:
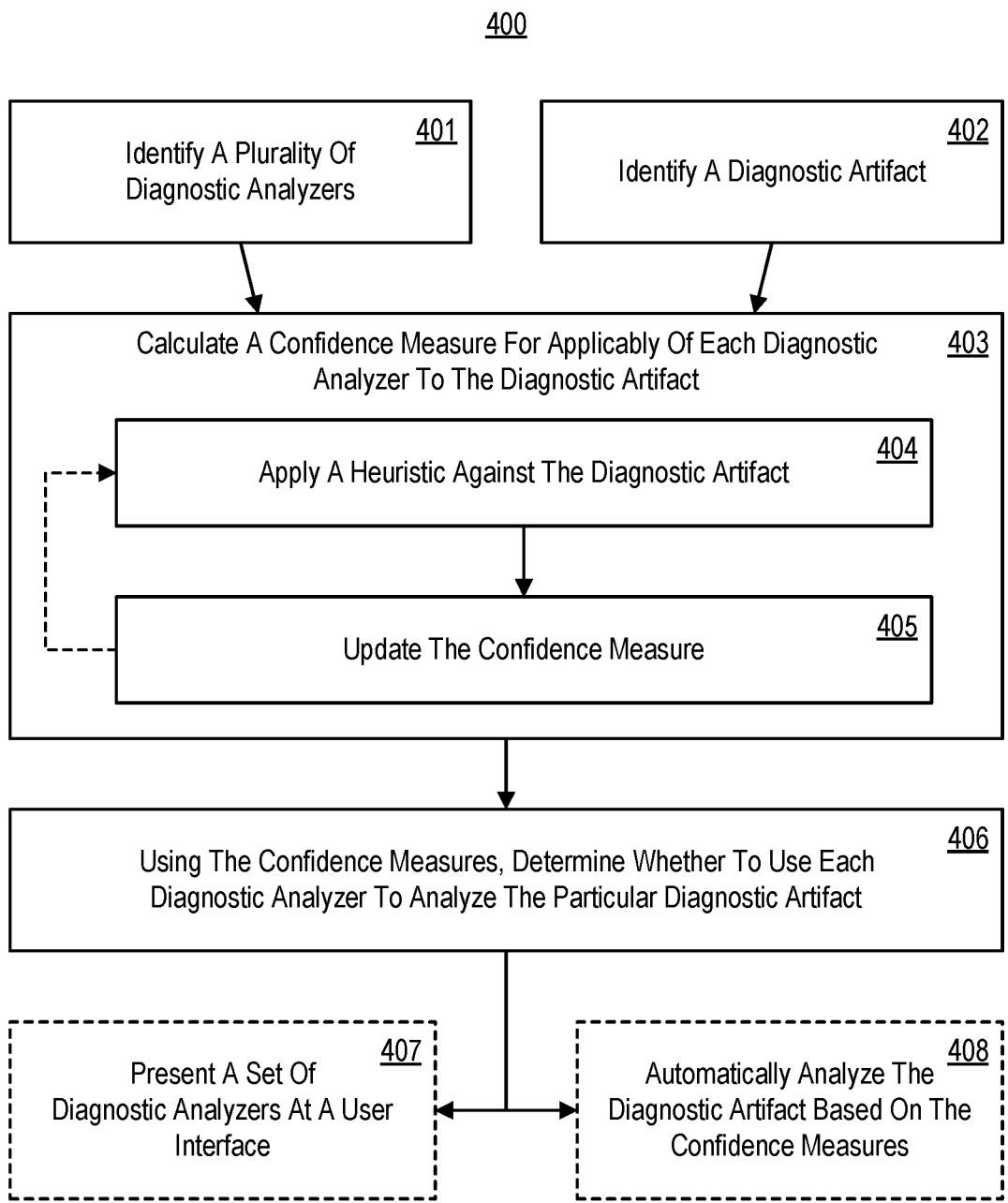
FIG. 4 illustrates a flow chart of an example method for using a confidence measure to automatically identify a diagnostic analyzer that applies to a diagnostic artifact.

A further description of the artifact analysis component 112 is now provided in connection with FIG. 4, which illustrates a flow chart of an example method 400 for using a confidence measure to automatically identify a diagnostic analyzer that applies to a diagnostic artifact. In embodiments, instructions for implementing method 400 are encoded as computer-executable instructions (e.g., artifact analysis component 112) stored on a computer program product (e.g., a hardware storage device, such as durable storage 103) that are executable by a processor (e.g., processor 101) to cause a computer system (e.g., computer system 100) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 1, the artifact analysis component 112 is shown as including an analyzer selection component 114, which in embodiments selects a set of diagnostic analyzers for application to a subject diagnostic artifact, based on computation of a confidence measure for each diagnostic analyzer in the set. The analyzer selection component 114, in turn, is shown as including an analyzer identification component 115, which in embodiments identifies/selects a set of diagnostic analyzers. Referring to FIG. 4, in embodiments, method 400 comprises an act 401 of identifying a plurality of diagnostic analyzers. In some embodiments, act 401 comprises identifying a plurality of diagnostic analyzers that are each configured to analyze diagnostic artifacts relating to prior executions of software entities, in order to generate analysis reports of one or more attributes of the prior executions of the software entities. In an example, the analyzer identification component 115 identifies a plurality of diagnostic analyzers (e.g., stored on the durable storage 103), including diagnostic analyzer 106. These diagnostic analyzers are structured to analyze a subject diagnostic artifact, such as diagnostic artifact 104, to generate an analysis report (e.g., analysis report 109) for that diagnostic artifact.

The analyzer selection component 114 is also shown as including an artifact identification component 116, which in embodiments identifies/selects a subject diagnostic artifact against which to compute a set of confidence measures. Referring to FIG. 4, in embodiments, method 400 also comprises an act 402 of identifying a diagnostic artifact. In some embodiments, act 402 comprises identifying a particular diagnostic artifact relating to a particular prior execution of a particular software entity. In an example, the artifact identification component 116 identifies diagnostic artifact 104 as a subject diagnostic artifact.

Act 401 and act 402 are illustrated in FIG. 4 without any express ordering between the acts indicating that, in various embodiments of method 400, act 401 and act 402 can be performed parallelly, or in serially (in either order).

As discussed, in embodiments diagnostic artifact 104 includes diagnostic data relating to execution of a process at computer system 100, or at another computer system, and is a memory dump, a process snapshot, an event trace log (i.e., a log generated by a kernel-level tracing facility, and that comprises kernel and/or application-defined events that occurred during execution of a subject process), a time-travel trace (i.e., a recording of a prior execution of a process, and which recording enables the process to be replayed later both forwards and backwards), and the like. Accordingly, in some embodiments of method 400, the particular software entity comprises a process, and the particular diagnostic artifact comprises one of: a memory dump of the process, a snapshot of the process, a time-travel trace of the process, or an event trace log of the process.

Referring to FIG. 1, the analyzer selection component 114 is also shown as including a confidence measure calculation component 117, which in embodiments calculates a confidence measure for each diagnostic analyzer identified by the analyzer identification component 115, with respect to the subject diagnostic artifact (e.g., diagnostic artifact 104) identified by the artifact identification component 116. Referring to FIG. 4, in embodiments, method 400 comprises an act 403 of calculating a confidence measure for applicably of each diagnostic analyzer to the diagnostic artifact. In some embodiments, act 403 comprises calculating a confidence measure for each respective diagnostic analyzer of the plurality of diagnostic analyzers, each confidence measure indicating a likelihood that the respective diagnostic analyzer applies to the particular diagnostic artifact. For example, the confidence measure calculation component 117 calculates a set of confidence measures for each diagnostic analyzer identified in act 401, based on a likelihood of that diagnostic analyzer being useful for generating an analysis report against the subject diagnostic artifact (e.g., diagnostic artifact 104) identified in act 402.

Referring to FIG. 1, the confidence measure calculation component 117 is shown as including a heuristic application component 119, which in embodiments applies one or more heuristics from each of a plurality of confidence queries to the subject diagnostic artifact. As discussed, each confidence query applies to a different diagnostic analyzer, such as confidence query 107 that applies to diagnostic analyzer 106. Referring to FIG. 4, in embodiments, for a given confidence query (e.g., confidence query 107) act 403 comprises an act 404 of applying a heuristic against the diagnostic artifact, and an act 405 of updating the confidence measure.

As shown, act 404 and act 405 are repeated for each heuristic (e.g., each of heuristic(s) 108) in the confidence query. In some embodiments of act 404, calculating each confidence measure comprises applying each of one or more heuristics specific to the respective diagnostic analyzer against the particular diagnostic artifact, while in some embodiments of act 405, when calculating each confidence measure, an outcome of application of each heuristic against the particular diagnostic artifact contributes to the confidence measure for the respective diagnostic analyzer. In an example, when processing each confidence query (e.g., confidence query 107) the heuristic application component 119 applies each heuristic in heuristic(s) 108 for that confidence query to diagnostic artifact 104, and potentially updates a confidence measure 118 (corresponding to diagnostic analyzer 106) based on application of each heuristic.

As discussed, in embodiments, applying a heuristic against a diagnostic artifact comprises applying the heuristic directly to the diagnostic artifact. Thus, in some embodiments of act 404, applying each of the one or more heuristics specific to the respective diagnostic analyzer against the particular diagnostic artifact comprises applying at least one heuristic directly to the particular diagnostic artifact. In embodiments, applying the at least one heuristic directly to the particular diagnostic artifact comprises at least one of: identifying a heap data structure contained in the particular diagnostic artifact, or identifying diagnostic metadata contained within the particular diagnostic artifact.

As discussed, in embodiments applying a heuristic against a diagnostic artifact comprises applying the heuristic to diagnostic metadata that is separate from the diagnostic artifact. Thus, in some embodiments of act 404, applying each of the one or more heuristics specific to the respective diagnostic analyzer against the particular diagnostic artifact comprises applying at least one heuristic to diagnostic metadata that is separate from the particular diagnostic artifact. In embodiments, applying the at least one heuristic to the diagnostic metadata that is separate from the particular diagnostic artifact comprises identifying a counter in the diagnostic metadata.

Referring to FIG. 1, the analyzer selection component 114 is shown as including an analyzer set identification component 120, which in embodiments uses a calculated set of confidence measures to identify a set of diagnostic analyzers to apply to a subject diagnostic artifact. Referring to FIG. 4, in embodiments, method 400 comprises an act 406 of, using the confidence measures, determining whether to use each diagnostic analyzer to analyze the particular diagnostic artifact. In some embodiments, act 406 comprises based on calculating the confidence measure for each respective diagnostic analyzer of the plurality of diagnostic analyzers, determining whether to include or exclude each of the plurality of diagnostic analyzers in a set of diagnostic analyzers with which to analyze the particular diagnostic artifact. For example, the analyzer selection component 114 uses the confidence measures calculated by the confidence measure calculation component 117 in act 403 to determine one or more of the diagnostic analyzers identified in act 401 to apply to the diagnostic artifact 104 identified in act 402.

In embodiments, the determining in act 406 includes, based on a first confidence measure for a first respective diagnostic analyzer being higher than a determined threshold, determining to include the first respective diagnostic analyzer in the set of diagnostic analyzers. In embodiments, the determining in act 406 also includes, based on a second confidence measure for a second respective diagnostic analyzer being lower than the determined threshold, determining to exclude the second respective diagnostic analyzer from the set of diagnostic analyzers. In an example, the analyzer set identification component 120 chooses diagnostic analyzer 106 for use in analyzing diagnostic artifact 104 (e.g., based on confidence measure 118 exceeding a threshold), and excludes another diagnostic analyzer from use in analyzing diagnostic artifact 104 (e.g., based on a corresponding confidence measure being lower than the threshold).

Referring to FIG. 1, the analyzer selection component 114 is shown as including a user interface component 113, which in embodiments presents one or more user interfaces (such as user interface 300), that display a set of diagnostic analyzers based, at least in part, on the confidence measures calculated by the confidence measure calculation component 117 in act 403. Referring to FIG. 4, in some embodiments, method 400 comprises an act 407 of present a set of diagnostic analyzers at a user interface.

In some embodiments, the user interface component 113 presents one or more diagnostic analyzers that were included in the set of diagnostic analyzers identified in act 406 (i.e., those diagnostic analyzers determined to be useful for analyzing diagnostic artifact 104). Thus, in some embodiments of act 407, the set of diagnostic analyzers is a first set of diagnostic analyzers, and the method further comprises presenting a second set of diagnostic analyzers at a user interface, the second set of diagnostic analyzers including the first set of diagnostic analyzers. In embodiments, presenting the second set of diagnostic analyzers at the user interface includes at least one of: presenting an indication of a calculated confidence measure for each respective diagnostic analyzer in the second set of diagnostic analyzers (e.g., the confidences shown in user interface 300), sorting the second set of diagnostic analyzers according to the calculated confidence measure for each respective diagnostic analyzer in the second set of diagnostic analyzers, or presenting each respective diagnostic analyzer in the first set of diagnostic analyzers as being selected for analyzing the particular diagnostic artifact (e.g., "Http web requests" and "String duplications" in user interface 300).

In other embodiments, the user interface component 113 also presents one or more diagnostic analyzers that were excluded from the set of diagnostic analyzers identified in act 406 (i.e., those diagnostic analyzers determined not to be useful for analyzing diagnostic artifact 104). Thus, in some embodiments of act 407, the second set of diagnostic analyzers includes at least the second respective diagnostic analyzer that was excluded from the first set of diagnostic analyzers. In these embodiments, presenting the second set of diagnostic analyzers at the user interface also includes presenting the second respective diagnostic analyzer as being not selected for analyzing the particular diagnostic artifact (e.g., "Exceptions" and "Array usage" in user interface 300).

Referring to FIG. 4, in embodiments, method 400 comprises an act 408 of automatically analyzing the diagnostic artifact based on the confidence measures. In some embodiments, act 408 comprises automatically analyzing the particular diagnostic artifact using each diagnostic analyzer in the set of diagnostic analyzers. For example, the artifact analysis component 112 causes computer system 100 to apply diagnostic analyzer 106 to diagnostic artifact 104 using processor 101, in order to generate analysis report 109. In some embodiments, each diagnostic analyzer in the set of diagnostic analyzers is used/applied in a sorted order that is based on a calculated confidence measure for each respective diagnostic analyzer in the set of diagnostic analyzers. As will be appreciated, by applying diagnostic analyzers in a sorted order (e.g., from highest confidence to lowest conference), computer system 100 may produce the most relevant analysis reports first.

As shown, in embodiments, method 400 may include only act 407, may include only act 408, or may include both act 407 and act 408.

Accordingly, at least some embodiments described herein provide methods, systems, and computer program products for applying heuristics to a diagnostic analyzer, which are used to determine a confidence measure about whether or not the diagnostic analyzer applies to a diagnostic artifact being diagnosed. In embodiments, confidence measures for a plurality of a diagnostic analyzers are used to automatically determine one or more of the plurality of diagnostic analyzers to apply to a particular diagnostic artifact. In embodiments, this confidence measure is also presented at a user interface to help a human user determine which diagnostic analyzer(s) to apply to the particular diagnostic artifact and/or is used to automatically apply one or more diagnostic analyzer(s) to the particular diagnostic artifact.

In embodiments, when a confidence measure indicates that diagnostic analyzer may not be useful for analyzing a diagnostic artifact (e.g., as having a value below a threshold), that diagnostic analyzer is excluded from being applied to the diagnostic artifact. This, in turn, reduces the amount of memory, CPU time, and energy that is consumed running diagnostic analyzers against the diagnostic artifact. Additionally, by focusing on only those diagnostic analyzers having confidence measures that indicate a high likelihood of being useful for analyzing a diagnostic artifact (e.g., as having a value above a threshold), a time for obtaining diagnostic results is reduced, and a relevance of the results generated is increased.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer system for using a confidence measure to automatically identify a diagnostic analyzer that applies to a diagnostic artifact, comprising:
   a processor; and
   a hardware storage device that stores computer-executable instructions that are executable by the processor to cause the computer system to at least:
   identify a plurality of diagnostic analyzers that are each configured to analyze diagnostic artifacts relating to prior executions of software entities, in order to generate analysis reports of one or more attributes of the prior executions of the software entities;
   identify a particular diagnostic artifact relating to a particular prior execution of a particular software entity;
   calculate the confidence measure for each respective diagnostic analyzer of the plurality of diagnostic analyzers, each confidence measure indicating a likelihood that the respective diagnostic analyzer applies to the particular diagnostic artifact, calculating each confidence measure comprising applying each of one or more heuristics specific to the respective diagnostic analyzer against the particular diagnostic artifact, an outcome of application of each heuristic against the particular diagnostic artifact contributing to the confidence measure for the respective diagnostic analyzer; and
   based on the calculated confidence measure for each respective diagnostic analyzer of the plurality of diagnostic analyzers, determine whether to include or exclude each of the plurality of diagnostic analyzers in a set of diagnostic analyzers with which to analyze the particular diagnostic artifact, including:
   based on a first confidence measure for a first respective diagnostic analyzer being higher than a determined threshold, determining to include the first respective diagnostic analyzer in the set of diagnostic analyzers; and
   based on a second confidence measure for a second respective diagnostic analyzer being lower than the determined threshold, determining to exclude the second respective diagnostic analyzer from the set of diagnostic analyzers.

2. The computer system of claim 1, wherein the particular software entity comprises a process, and wherein the particular diagnostic artifact comprises one of:
   a memory dump of the process,
   a snapshot of the process,
   a time-travel trace of the process, or
   an event trace log of the process.

3. The computer system of claim 1, wherein applying each of the one or more heuristics specific to the respective diagnostic analyzer against the particular diagnostic artifact comprises:

applying at least one heuristic directly to the particular diagnostic artifact.

4. The computer system of claim 3, wherein applying the at least one heuristic directly to the particular diagnostic artifact comprises at least one of:
identifying a heap data structure contained in the particular diagnostic artifact, or
identifying diagnostic metadata contained within the particular diagnostic artifact.

5. The computer system of claim 1, wherein applying each of the one or more heuristics specific to the respective diagnostic analyzer against the particular diagnostic artifact comprises:
applying at least one heuristic to diagnostic metadata that is separate from the particular diagnostic artifact.

6. The computer system of claim 5, wherein applying the at least one heuristic to the diagnostic metadata that is separate from the particular diagnostic artifact comprises:
identifying a counter in the diagnostic metadata.

7. The computer system of claim 1, wherein the set of diagnostic analyzers is a first set of diagnostic analyzers, and wherein the computer-executable instructions also include instructions that are executable by the processor to cause the computer system to:
present a second set of diagnostic analyzers at a user interface, the second set of diagnostic analyzers including the first set of diagnostic analyzers, presenting the second set of diagnostic analyzers at the user interface including at least one of:
presenting an indication of the calculated confidence measure for each respective diagnostic analyzer in the second set of diagnostic analyzers;
sorting the second set of diagnostic analyzers according to the calculated confidence measure for each respective diagnostic analyzer in the second set of diagnostic analyzers; or
presenting each respective diagnostic analyzer in the first set of diagnostic analyzers as being selected for analyzing the particular diagnostic artifact.

8. The computer system of claim 7, wherein the second set of diagnostic analyzers includes at least the second respective diagnostic analyzer that was excluded from the first set of diagnostic analyzers.

9. The computer system of claim 8, wherein presenting the second set of diagnostic analyzers at the user interface also includes:
presenting the second respective diagnostic analyzer as being not selected for analyzing the particular diagnostic artifact.

10. The computer system of claim 1, the computer-executable instructions also including instructions that are executable by the processor to cause the computer system to:
automatically analyze the particular diagnostic artifact using each diagnostic analyzer in the set of diagnostic analyzers.

11. The computer system of claim 10, wherein the computer system uses each diagnostic analyzer in the set of diagnostic analyzers in a sorted order that is based on the calculated confidence measure for each respective diagnostic analyzer in the set of diagnostic analyzers.

12. A method, implemented at a computer system that includes a processor, for using a confidence measure to automatically identify a diagnostic analyzer that applies to a diagnostic artifact, the method comprising:
identifying a plurality of diagnostic analyzers that are each configured to analyze diagnostic artifacts relating to prior executions of software entities, in order to generate analysis reports of one or more attributes of the prior executions of the software entities;
identifying a particular diagnostic artifact relating to a particular prior execution of a particular software entity;
calculating the confidence measure for each respective diagnostic analyzer of the plurality of diagnostic analyzers, each confidence measure indicating a likelihood that the respective diagnostic analyzer applies to the particular diagnostic artifact, calculating each confidence measure comprising applying each of one or more heuristics specific to the respective diagnostic analyzer against the particular diagnostic artifact, an outcome of application of each heuristic against the particular diagnostic artifact contributing to the confidence measure for the respective diagnostic analyzer; and
based on the calculated confidence measure for each respective diagnostic analyzer of the plurality of diagnostic analyzers, determining whether to include or exclude each of the plurality of diagnostic analyzers in a set of diagnostic analyzers with which to analyze the particular diagnostic artifact, including:
based on a first confidence measure for a first respective diagnostic analyzer being higher than a determined threshold, determining to include the first respective diagnostic analyzer in the set of diagnostic analyzers; and
based on a second confidence measure for a second respective diagnostic analyzer being lower than the determined threshold, determining to exclude the second respective diagnostic analyzer from the set of diagnostic analyzers.

13. The method of claim 12, wherein the particular software entity comprises a process, and wherein the particular diagnostic artifact comprises one of:
a memory dump of the process,
a snapshot of the process,
a time-travel trace of the process, or
an event trace log of the process.

14. The method of claim 12, wherein applying each of the one or more heuristics specific to the respective diagnostic analyzer against the particular diagnostic artifact comprises:
applying at least one heuristic directly to the particular diagnostic artifact.

15. The method of claim 12, wherein applying each of the one or more heuristics specific to the respective diagnostic analyzer against the particular diagnostic artifact comprises:
applying at least one heuristic to diagnostic metadata that is separate from the particular diagnostic artifact.

16. The method of claim 12, wherein, the set of diagnostic analyzers is a first set of diagnostic analyzers, and wherein the method further comprises:
presenting a second set of diagnostic analyzers at a user interface, the second set of diagnostic analyzers including the first set of diagnostic analyzers, presenting the second set of diagnostic analyzers at the user interface including at least one of:
presenting an indication of a calculated confidence measure for each respective diagnostic analyzer in the second set of diagnostic analyzers;
sorting the second set of diagnostic analyzers according to the calculated confidence measure for each respective diagnostic analyzer in the second set of diagnostic analyzers; or presenting each respective diagnostic analyzer in the first set of diagnostic analyzers as being selected for analyzing the particular diagnostic artifact.

17. The method of claim 16, wherein the second set of diagnostic analyzers includes at least the second respective diagnostic analyzer that was excluded from the first set of diagnostic analyzers, and wherein presenting the second set of diagnostic analyzers at the user interface also includes:

presenting the second respective diagnostic analyzer as being not selected for analyzing the particular diagnostic artifact.

18. The method of claim 12, further comprising:

automatically analyzing the particular diagnostic artifact using each diagnostic analyzer in the set of diagnostic analyzers.

19. The method of claim 18, wherein each diagnostic analyzer in the set of diagnostic analyzers is used in a sorted order that is based on the calculated confidence measure for each respective diagnostic analyzer in the set of diagnostic analyzers.

20. A computer program product comprising a hardware storage device that stores computer-executable instructions that are executable by a processor to cause a computer system to use a confidence measure to automatically identify a diagnostic analyzer that applies to a diagnostic artifact, the computer-executable instructions including instructions that are executable by the processor to cause the computer system to at least:

identify a plurality of diagnostic analyzers that are each configured to analyze diagnostic artifacts relating to prior executions of software entities, in order to generate analysis reports of one or more attributes of the prior executions of the software entities;

identify a particular diagnostic artifact relating to a particular prior execution of a particular software entity;

calculate the confidence measure for each respective diagnostic analyzer of the plurality of diagnostic analyzers, each confidence measure indicating a likelihood that the respective diagnostic analyzer applies to the particular diagnostic artifact, calculating each confidence measure comprising applying each of one or more heuristics specific to the respective diagnostic analyzer against the particular diagnostic artifact, an outcome of application of each heuristic against the particular diagnostic artifact contributing to the confidence measure for the respective diagnostic analyzer; and based on the calculated confidence measure for each respective diagnostic analyzer of the plurality of diagnostic analyzers, determine whether to include or exclude each of the plurality of diagnostic analyzers in a set of diagnostic analyzers with which to analyze the particular diagnostic artifact, including:

based on a first confidence measure for a first respective diagnostic analyzer being higher than a determined threshold, determining to include the first respective diagnostic analyzer in the set of diagnostic analyzers; and based on a second confidence measure for a second respective diagnostic analyzer being lower than the determined threshold, determining to exclude the second respective diagnostic analyzer from the set of diagnostic analyzers.

* * * * *